(12) United States Patent
Watkins

(10) Patent No.: US 7,024,389 B1
(45) Date of Patent: *Apr. 4, 2006

(54) SYSTEM AND METHOD FOR USING A PAYROLL DEDUCTION CARD AS A PAYMENT INSTRUMENT

(75) Inventor: Kirk Watkins, Warrington, PA (US)

(73) Assignee: E-Duction, Inc., Blue Bell, PA (US)

( * ) Notice: Subject to any disclaimer, the term of this patent is extended or adjusted under 35 U.S.C. 154(b) by 520 days.

This patent is subject to a terminal disclaimer.

(21) Appl. No.: 09/497,142

(22) Filed: Feb. 3, 2000

Related U.S. Application Data

(63) Continuation-in-part of application No. 09/429,616, filed on Oct. 29, 1999, now Pat. No. 6,347,305.

(51) Int. Cl.
*G06F 17/60* (2006.01)

(52) U.S. Cl. .............................. 705/39; 705/26; 705/38; 705/40; 705/41

(58) Field of Classification Search ................... 705/26, 705/38–41; 235/375, 379, 380
See application file for complete search history.

(56) References Cited

U.S. PATENT DOCUMENTS

| | | | |
|---|---|---|---|
| 5,283,829 A | 2/1994 | Anderson | 380/24 |
| 5,739,512 A | 4/1998 | Tognazzini | 235/380 |
| 5,758,327 A | 5/1998 | Gardner et al. | 705/26 |

(Continued)

FOREIGN PATENT DOCUMENTS

| | | | |
|---|---|---|---|
| EP | 0 725 376 A2 | | 8/1996 |
| JP | 10149485 A | * | 6/1998 |
| ZA | 9711707 A | * | 8/1998 |

OTHER PUBLICATIONS

J. E. Price, M. D. Haddock, H. R. Brock, College Accounting, Glencoe Div. Macmillan/ Mcgraw Hill, 1994, pp. 347–357.*

Microsoft Computer Dictionary, Third Edition, Microsoft Press, 1997, p. 456.*

(Continued)

*Primary Examiner*—Vincent Millin
*Assistant Examiner*—Charles R. Kyle
(74) *Attorney, Agent, or Firm*—Morrison & Foerster LLP

(57) ABSTRACT

The present invention relates to a system and method for using an e-duction card as a payment instrument, whereby a purchase price of articles purchased on-line or off-line is deducted from an employee's paycheck. The e-duction card is similar to a credit card but is not bound by the same terms and conditions of a credit card. An employer authorizes the inventive system to accept payroll deduction as a payment option for the employer's employees. The employer and/or the system establish guidelines for utilizing the payroll deduction option during commerce and the system stores the guidelines and identifying information for the employer and corresponding employees in a database. Merchants also sign up with the inventive system and agree to accept the e-duction card is a payment instrument. Thereafter, when an employee selects articles from the merchant's web site or store, the employee may use the e-duction card to pay for the selected articles. A magnetic stripe on the e-duction card stores a employee's account information. When a consumer purchases a product and uses the e-duction card as a payment instrument, the account information on the e-duction magnetic stripe is transmitted to a network processor with-access to information stored on the database. The processor verifies the employee and merchant status, and the employee account information in order to approve or reject the transaction. This method therefore affords authorized employees the option of using the e-duction card is a payment instrument.

13 Claims, 5 Drawing Sheets

U.S. PATENT DOCUMENTS

| | | | |
|---|---|---|---|
| 5,878,141 A | 3/1999 | Daly et al. | 380/25 |
| 5,895,454 A | 4/1999 | Harrington | 705/26 |
| 5,920,847 A | 7/1999 | Kolling et al. | 705/40 |
| 5,943,424 A | 8/1999 | Berger et al. | 380/25 |
| 6,282,522 B1 * | 8/2001 | Davis et al. | 705/41 |
| 6,401,079 B1 * | 6/2002 | Kahn et al. | 705/30 |
| 2001/0034676 A1 * | 10/2001 | Vasic | |
| 2003/0074311 A1 * | 4/2003 | Saylors et al. | 705/39 |

OTHER PUBLICATIONS

Dictionary of Finance and Investment Terms, Fifth Edition, J. Downes and J. E. Goodman Barrons Educational Guides, p. 589.*

PCT International Search Report; Dec. 21, 2000.

O'Mahoney et al., "Electronic Payment Systems," 1997; Chapter 4; XP–002153672; pp. 61–63.

"Microsoft, VISA and MasterCard's Push For Secure On–Line Transactions"; Chain Store Age, Sep. 1995; p. 136.

"Shoes For Crews: Payroll Deduction Plan—How it Works," www.shoesforcrews.com.

Payroll Deduction Request, Powerco Credit Union, www.powercocu.org.

Kirtley–Cole Company Store Online Apparel and Gift Ordering Form, www.kiftley–cole.com.

* cited by examiner

SYSTEM AND METHOD FOR USING A PAYROLL DEDUCTION CARD AS A PAYMENT INSTRUMENT

This application repeats a substantial portion of prior application Ser. No. 09/429,616, filed on Oct. 29, 1999 now U.S. Pat. No. 6,347,305 and adds and claims additional disclosure not presented in the prior application. This application names an inventor named in the prior application, it constitutes a continuation-in-part of the prior application.

FIELD OF THE INVENTION

The present invention relates to a system and method for processing payments of articles selected during electronic commerce or off-line commerce, and more particularly, to a method for using a payroll deduction card as a payment option during on-line and off-line commerce.

BACKGROUND OF THE INVENTION

Advances in computer processing power and network communications have made information from a wide variety of sources available to users on computer networks. Computer networking allows network computer users to share information, software applications and hardware devices, and internetworking enables a set of physical networks to be connected into a single network such as the Internet. Computers connected to the Internet or connected to networks other than the Internet also have access to information stored on those networks. The World Wide Web (Web), a hypermedia system used on the Internet, enables hypertext linking, whereby documents automatically reference or link other documents located on connected computer networks around the world. Thus, users connected to the Internet have almost instant access to information stored in relatively distant regions.

A page of information on the Web may include references to other Web pages and may include a broad range of multimedia data including textual, graphical, audio, and animation information. Currently, Internet users retrieve information from the Internet, through the Web, by 'visiting' a web site on a computer that is connected to the Internet.

The web site is, in general terms, a server application that displays information stored on a network server computer. The web site accepts connections from client programs, such as Internet browser applications. Browser applications, such as Microsoft Explorer™ or Netscape Internet Browser™, allow Internet users to access information displayed on the web site. Most browser applications display information on computer screens and permit a user to navigate through the Web using a mouse. Like other network applications, Web browsing uses a client-server paradigm. When given a Uniform Resource Locator (URL) of a document, the browser application becomes a client and it contacts a server application specified in the URL to request the document. After receiving the document from the server application, the browser application displays the document to the user. When the browser application interacts with the server application, the two applications follow the Hyper-Text Transport Protocol (HTTP). HTTP allows the browser application to request a specific article, which the server application then returns. To ensure that browser applications and server applications inter-operate unambiguously, HTTP defines the exact format for requests sent from the browser application to the server application as well as the format of replies that the server application returns.

As the number of physical networks connected to the Internet continues to grow, so too will the number of web sites that are accessible to Internet users and so too will commercial activity on the Internet. Providers of a wide range of products and/or services are continuously exploring new methods for promoting and selling them. Commercial vendors' web sites are similar to other types of web sites except that they usually incorporate functionality to enable financial transactions between users and vendors.

Currently, during an electronic commerce transaction on the Internet, a consumer enters the URL of a vendor and the browser application requests a web page associated with the URL from the appropriate server application. The consumer may select articles displayed on the vendor's web page and submit the selection to the vendor through the browser application. For example, a consumer on the Internet, wishing to purchase a software application, may enter the URL of a vendor into the browser application. The browser displays a corresponding web page and the consumer may order the software application on the web page through the browser application. Upon receiving the consumer's selection, the vendor requests payment for the selected articles before delivering them to the consumer. The consumer may pay the vendor through credit cards or the vendor may require cash upon delivery of the selected articles. However, for consumers who do not have credit cards, do not wish to use credit cards, or do not have cash available at the time of delivery of the selected articles, this method of purchasing articles during electronic commerce is unsatisfactory.

Some employers currently offer, as a benefit to their employees, payroll deduction plans as a method of paying for predetermined products and/or services with predetermined vendors. Under the payroll deduction plan, the employer may deduct the cost of already purchased articles and/or services from an employee's future pay checks. Before the employee can use the payroll deduction plan as a payment option, the employer must approve the total purchase amount and the vendor. While this scheme affords employees the option of purchasing products and services on future earnings, the list of predefined products/services and vendors is usually limited. Moreover, the payroll deduction payment option is not utilized in electronic commerce. As electronic commerce on the Internet grows, so too will the desire to use the payroll deduction plan as an option for on-line purchases.

SUMMARY OF THE INVENTION

The present invention relates to a system and method for using an e-duction card as a payment instrument, whereby a purchase price of articles purchased on-line or off-line is deducted from an employee's paycheck. The e-duction card is similar to a credit card but is not bound by the same terms and conditions of a credit card. With the present inventive system and e-duction card, an employer authorizes the inventive system to accept payroll deduction as a payment option for the employer's employees. The employer and/or the system establish guidelines for employee utilization of the payroll deduction option during commerce. The system stores the guidelines and identifying information for the employer and corresponding employees who will use the payroll deduction in a database. Alternatively, the employer may periodically provide a list of employees (with corresponding information) who qualify to participate in the payroll deduction plan and the system then updates the database with the periodic list. Merchants also sign up with the inventive system and agree to accept the e-duction card as a payment instrument.

Thereafter, when an employee selects articles from the merchant's web site, store, catalog, or other related device, the employee may use the e-duction card to pay for the selected articles. The e-duction card may be executed on it's own network infrastructure or on existing network infrastructures, such as an American Express network infrastructure or a Visa/Mastercard network infrastructure. A magnetic stripe on the e-duction card stores the employee's account information. When that employee purchases a product and uses the e-duction card as a payment instrument, the account information on the e-duction magnetic stripe is transmitted to a network processor with access to information stored on the database. The processor verifies the employee and merchant status, and verifies the employee account information in order to approve or reject the transaction. This method, therefore, affords authorized employees the option of using the e-duction card as a payment instrument.

Specifically in a preferred embodiment of the present invention, when an employee 'enters' the selected merchant's web site or store and chooses articles to be purchased, the employee may pay for the items with the e-duction card. Account information that is stored on the e-duction card's magnetic stripe is transmitted to the network processor. The network processor is a processor used in an existing network infrastructure and all account information stored in the database is also stored in the processor's database. The network processor uses the account information to verify the employee's employment status and to verify that the employee is authorized to use payroll deduction for the amount of the purchase. The network processor also verifiers that the merchant is a participating merchant. Upon verifying the employee and merchant information, the network processor may approve or reject the transaction. If the transaction is approved, the employee's account is debited and the employee is notified. Alternatively, the system may include its own processor for processing transactions.

Data is uploaded to the database at specific times during predefined periods. Information in the database is downloaded to a payroll processor (which can, of course, be the employer) at predetermined times. The payroll processor deducts the transaction amount from the employee's paycheck and a statement of the deduction is given to the employee.

In a preferred embodiment of the invention, the e-duction card may also serve as a smart card. A chip is embedded in the e-duction card and the information on the chip is updated when a transaction is approved.

It is therefore the object of the present invention to provide a method for authorizing selected vendors to offer payroll deduction as a payment option to appropriate consumers during commerce transactions and for establishing guidelines for the payroll deduction plan.

It is another object of the invention to provide a method for allowing the consumer to select payroll deduction as a payment option during on-line shopping and for confirming the selection before it is processed against the e-duction card.

Additional features and advantages of the invention will be set forth in the description that follows, and in part will be apparent from the description, or may be learned by practice of the invention. The objectives and advantages of the invention will be realized and attained by the system particularly pointed out in the written description and claims hereof as well as the appended drawings.
To achieve these and other advantages and in accordance with the purpose of the invention, as embodied and broadly described, the present invention provides a method for using an e-duction card as a payment instrument during on-line and off-line purchases with a participating merchant, whereby a purchase amount paid with the e-duction card is deducted from an employee's future paycheck, the method comprising the steps of: authorizing, by an employer, a processing system to offer payroll deduction as a payment option during commerce transactions between the employee and the participating merchant; signing-up, by the processing system, merchants who agree to accept the e-duction card; establishing, by the processing system and the employer and by the processing system and the participating merchant, guidelines for using the e-duction card; creating, by the processing system, e-duction cards that are used as a payment option by authorized employees and accounts that correspond to the e-duction cards; selecting, by the employee, articles to be purchased from the participating merchant and paying for the articles with the e-duction card; submitting, by the participating merchant to a network processor, information stored on the e-duction card; verifying, by a network processor, the employee and merchant status; processing, by the network processor, a transaction reflecting the employee's purchase; transferring, by the network processor to a payroll processor, the transaction in order for the transaction amount to be deducted from the employee's future paycheck; and updating the employee corresponding account and notifying the employee by the processing system.

An alternate embodiment of the present invention provides a system for using an e-duction card as a payment instrument during on-line and off-line purchases with a participating merchant, whereby a purchase amount paid with the e-duction card is deducted from an employee's future paycheck, the system comprises: first processing means for authorizing, by an employer, a processing system to offer payroll deduction as a payment option during commerce transactions between the employee and the participating merchant; second processing means for signing-up, by the processing system, merchants who agree to accept the e-duction card; third processing means for establishing, by the processing system and the employer and by the processing system and the participating merchant, guidelines for using the e-duction card; fourth processing means for creating, by the processing system, e-duction cards that are used as a payment option by authorized employees and accounts that correspond to the e-duction cards; fifth processing means for selecting, by the employee, articles to be purchased from the participating merchant and for paying for the articles with the e-duction card; sixth processing means for submitting, by the participating merchant to a network processor, information stored on the e-duction card; seventh processing means for verifying, by a network processor, the employee and merchant status; eight processing means for processing, by the network processor, a transaction reflecting the employee's purchase; ninth processing means for transferring, by the network processor to a payroll processor, the transaction in order for the transaction amount to be deducted from the employee's future paycheck; and tenth processing means for updating the employee corresponding account and for notifying the employee by the processing system.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawings. The present invention described below describes the functionality of the inventive system and method for processing payroll deduction by using an e-duction card.

Figure 1:
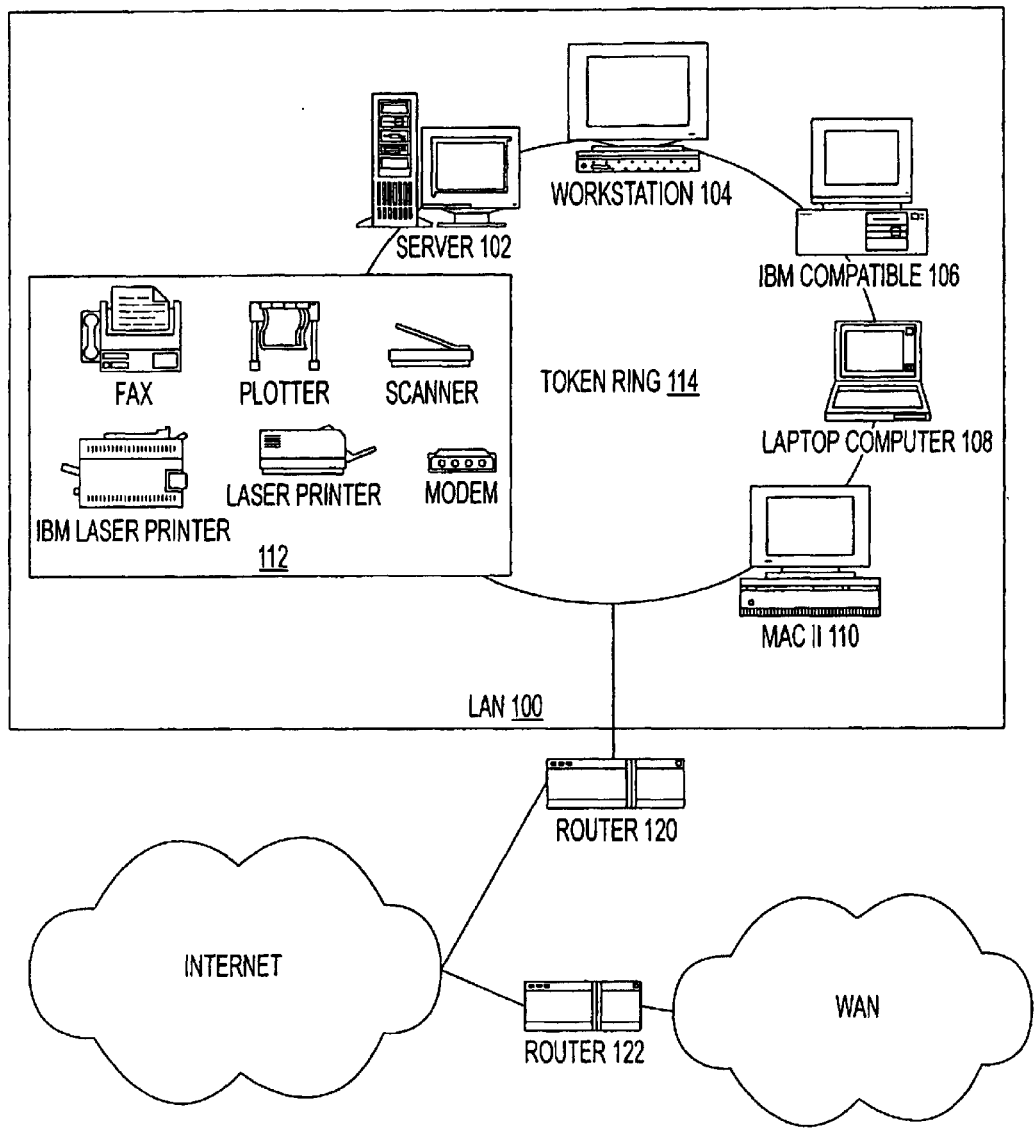
FIG. 1 illustrates a computer network in which the inventive payroll deduction plan may be incorporated;.

FIG. 1 is an example of a local area network (LAN) 100 that is configured to utilize anon-repudiation protocol. LAN 100 comprises a server 102, four computer systems 104, 106, 108, and 110, and peripherals 112, such as printers and other devices that may be shared by components on LAN 100. Computer systems 104, 106, 108 and 110 may serve as clients for server 102 and/or as clients and/or servers for each other and/or for other components connected to LAN 100. Components on LAN 100 are preferably connected together by cable media, for example copper or fiber-optic cable and the network topology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and the routers that connect them must adhere to a standard protocol. Computer networks connected to the Internet and to other networks typically use TCP/IP Layering Model Protocol. It should be noted that other internetworking protocols may be used.

Figure 2:
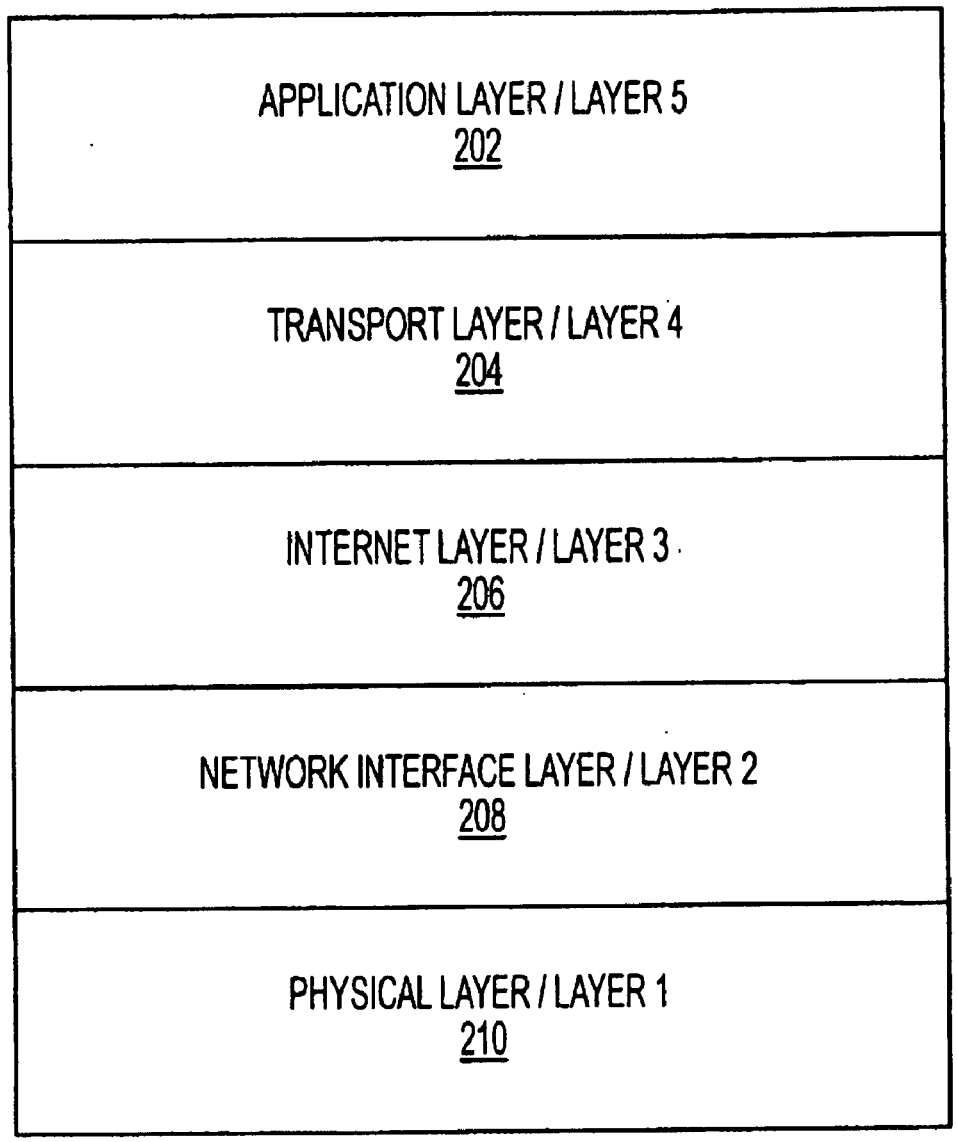
FIG. 2 illustrates the TCP/IP Layering Model Protocol used during communications between components on the computer network.

As illustrated in FIG. 2, the TCP/IP Layering Model comprises an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component. connected to the network can communicate with any other component connected directly or indirectly to one of the attached networks.

Figure 3:
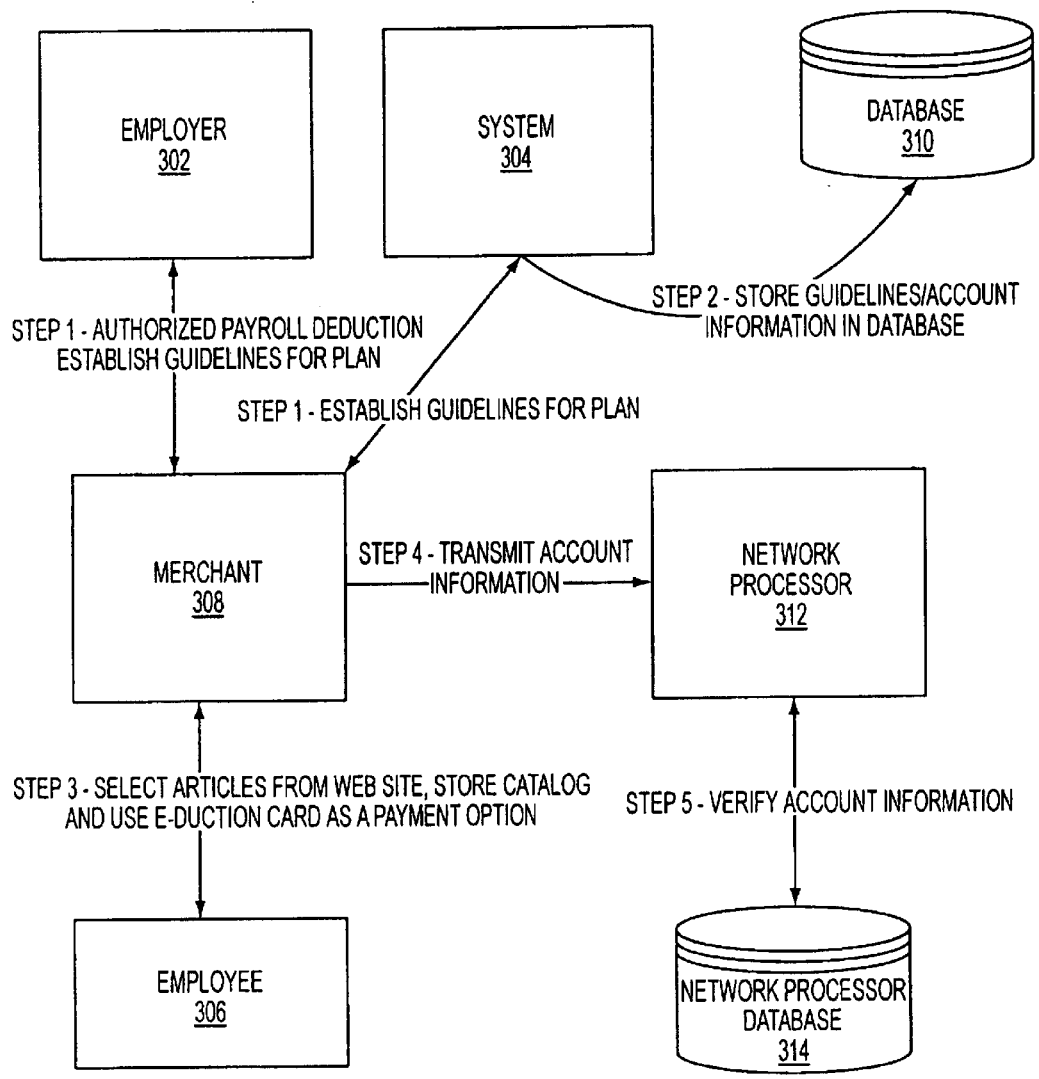
FIG. 3 illustrates a method for using an e-duction card as payroll deduction instrument during on-line or off-line purchases.

FIG. 3 illustrates an inventive method for using an e-duction card as a payment instrument in order to deduct the price of a purchased item from an employee's future paycheck. According to the invention, an employer 302 authorizes system 304 to accept payroll deduction as a unique form of payment during a commerce transaction with the employer's employees, an example-of which is shown as employee 306. System 304 also enables merchants 308, who agree to accept the e-duction card as a payment instrument, to participate in a payroll deduction plan. During the initial authorization, employer 302 and/or system 304 representative establish guidelines for a payroll deduction plan. For example, employer 302 and system 304 representative may establish a purchase price limit versus a maximum balance that an employee may carry on the e-duction card, the number of pay periods during which deductions can occur and the number of transactions allowed to each employee 306. They also may base the number of payroll deductions on the total purchase price. For example, a purchase price that is less than forty-nine dollars and ninety nine cents is deducted from one future paycheck; a purchase price that is greater than fifty dollars and less ninety-nine dollars and ninety nine cents is deducted from two future paychecks, and so on.

Employer 302 and system 304 representative also may establish several sets of guidelines, whereby each set is associated with employees 306 within a specific status. For example, one set of guidelines may apply to hourly employees and another set may apply to salaried employees. Employees 306 may view all guidelines or only those that apply to them and guidelines associated with each employee 302 may change as the employee's status changes.

During initial setup, system 304 also may setup guidelines with merchants 308. For example, a merchant 308 may be authorized to offer interest free payroll deductions up to a predefined time for payments over a certain amount. Merchants 308 using system 304 may also automatically deduct monthly payments, such as utility bills and investments, if employee 306 is authorized to use payroll deduction for such transactions. The payroll deduction plan guidelines and other information that identify employer 302 and corresponding employees 306 are stored on a database 310 in system 304. Alternatively, employer 302 may periodically provide a list to the system 304 with information about employees who qualify to participate in the payroll deduction plan. The system 304 then updates database 310 with the periodic list.

Thereafter, when an employee selects articles from the merchant's 308 web site or store, employee 306 may use the e-duction card to pay for the selected articles. Additionally, an employee may use the e-duction card in commerce in any similar fashion as any type of credit card is used. For example, employee 306 may use the e-duction card when purchasing items from a catalog, through telemarketing, offers appearing on the television, etc. Other methods of purchase will be known to those skilled in the art and are within the scope of this invention.

The e-duction card used is similar to a credit card, but is not bound by the same terms and conditions of a credit card.

For example, employees using the e-duction card may not be charged interest or transaction fees to use the e-duction card. The e-duction card may be executed on its own network infrastructure or on existing network infrastructures, such as an American Express network infrastructure or a Visa/Mastercard network infrastructure. Existing networks issue private brand cards, which carry the network's logo. Thus, an e-duction card may be a private brand that is executed on an existing network infrastructure and looks the same as currently used credit card, such as American Express card and Visa card, among others. Of course, the e-duction may not necessarily carry the network's logo. A magnetic stripe on the e-duction card stores employee 306 account information, as is stored in database 310.

Thereafter, employees 306 may use the e-duction card as a payment instrument for articles purchased on-line or in a store. When an employee 306 chooses articles to be purchased from a participating merchant, employee 306 may swipe the e-duction card in an existing network infrastructure. Alternatively, employee 306 may 'enter' the merchant's 308 web site and upon selecting articles to be purchased, enter the account number of the e-duction card on the merchant's web site, or may select items from a catalog and enter the account number of the e-duction card on a form or over the telephone. Other commerce transactions are known to those skilled in the art and are within the scope of this invention.

When the e-duction card is swiped into the network infrastructure, account information that is stored on the e-duction card's magnetic stripe is transmitted to network processor 312. Network processor 312 may be a processor used in an existing network infrastructure and all account information stored in database 310 also is stored in the network processor's database 314. Network processor 312 uses the account information and information stored in the processor's database 314 to verify the employee's employment status and to verify that employee 306 is authorized to use payroll deduction for the amount of the purchase. The network processor also verifies that merchant 308 transmitting the account information is a participating merchant by verifying that merchant 308 account number exists in the processor's database. Upon verifying employee 306 and merchant 308 information, network processor 312 may approve or reject the transaction. Alternatively, the e-duction card may be swiped into it's own network infrastructure and system 304 may verify employee 306 and merchant 308 account information and approve or reject the transaction.

Data in the network processor's database 314 and database 310 are synchronized at predetermined times and synchronized data from either database 314 or database 310 is transmitted to appropriate payroll processors at predetermined times. For example, at the end of a work week, accounts in database 310 that have been updated since the last transmission are sent to the appropriate payroll processor. Based on employee 306 account information in database 310, system 304 can determine who is employee's 306 employer, and which payroll processor processes the employee 306 paychecks. Some employers use paycheck processing companies to process their payroll and other employers perform this task themselves. Information transmitted from database 310 to a payroll processor may include employee's 306 social security number, name, and the amount to be deducted from each paycheck or the total amount of a transaction. When the payroll processor cuts the next check for employee 306, it deducts the appropriate amount and notifies system 304. System 304 updates employee 306 account in database 310 in order to reflect the payment. A statement notifying employee 306 of the payroll deduction is sent to employee 306 through the mail or by e-mail. If employee 306 is notified by e-mail, employee 306 may link to a system web site to review a purchasing history. Thus, employee 306 may review all payroll deductions for all articles purchased within a predefined period of time.

In an alternate embodiment of the invention, the e-duction card may include a chip that stores employee 306 account information and purchasing history, thereby functioning as a smart card. Information in the chip may include, among other things, employee 306 account number, employer, and payroll deduction status. Information in the e-duction card chip is updated after each transaction to reflect the transaction.

Figure 4A:
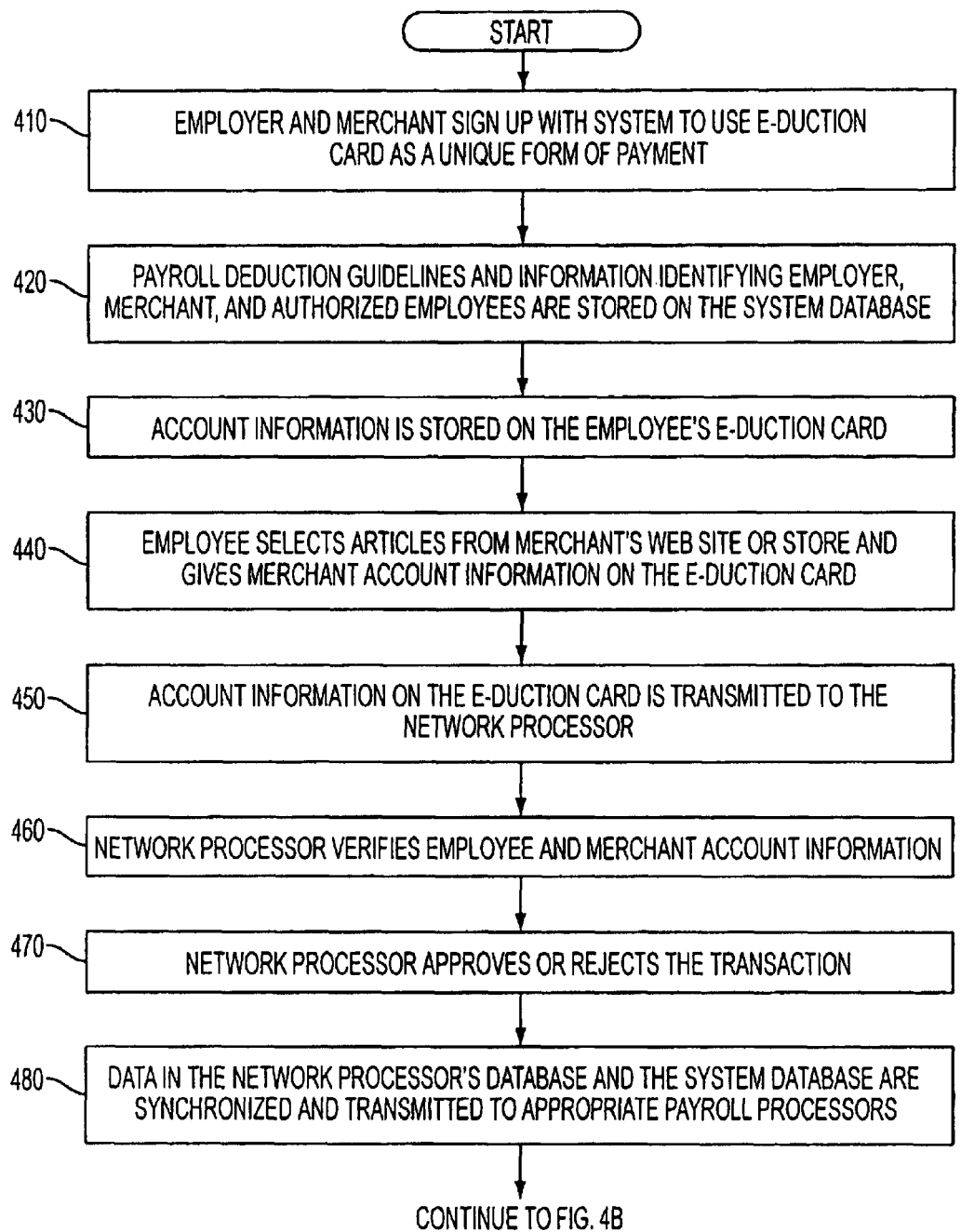
FIGS. 4A and 4B illustrate the steps implemented according to the preferred embodiment of the inventive method of FIG. 3.
Figure 4B:
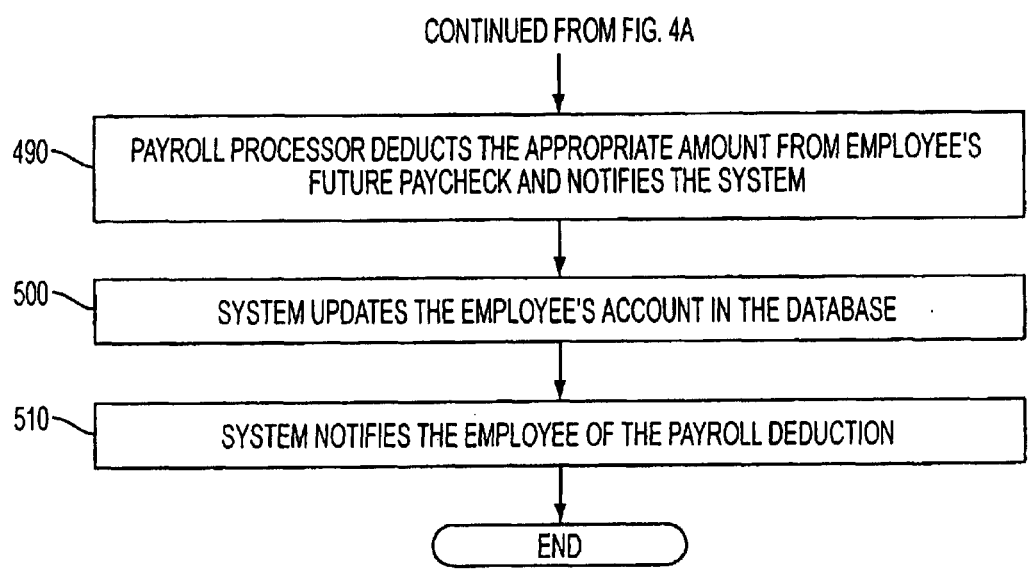

FIG. 4 illustrates the steps implemented in a preferred embodiment of the inventive payroll deduction method. In Step 410, employer 302 and merchant 308 sign up with system 304 to use the e-duction card as a unique form of payment during a commerce transaction with the employer's employees and establish guidelines for a payroll deduction plan.

In Step 420, the payroll deduction plan guidelines and other information that identify employer 302, merchant 308, and corresponding employees 306 are stored on a database 310 in system 304. In Step 430, account information is stored on employee 306 e-duction card. In Step 440, employee 306 selects articles from the merchant's 308 web site or store, swipes the e-duction card in a network infrastructure or enters an account number on the e-duction card on the merchant's web site. In Step 450, account information that is stored on the e-duction card's magnetic stripe is transmitted to network processor 312. In Step 460, network processor 312 uses the account information and information stored in database 314 to verify employee's employment status, that employee 306 is authorized to use payroll deduction for the amount of the purchase, and that merchant 308 transmitting the account information is a participating merchant. In Step 470, network processor 312 may approve or reject the transaction.

In Step 480, data in the network processor's database 314 and database 310 are synchronized at predetermined times and synchronized data from either database 314 or database 310 is transmitted to appropriate payroll processors at predetermined times. In Step 490, the payroll processor deducts the appropriate amount from employee 306 future paychecks and notifies system 304. In Step 500, system 304 updates employee 306 account in database 310 in order to reflect the payment. In Step 510, a statement notifying employee 306 of the payroll deduction is sent to the employee through the mail, an e-mail, or by the employee accessing a web site containing the information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A method comprising:

establishing an electronic connection between a network processor and a payroll system;

establishing a payroll deduction card account to enable an employee to charge a purchase to said payroll deduction card account to pay for a purchase made from a participating merchant;

receiving a request from said participating merchant to apply a charge to said payroll deduction card account;

cross referencing the payroll deduction card account to the payroll of said employee, wherein said charge applied to said payroll deduction card account is automatically and dynamically deducted from said payroll;

determining an amount to be deducted from one or more of said employee's future paychecks, based on the amount of said charge;

transmitting an instruction to said payroll system to cover said charge on said employee's payroll deduction card account;

applying said amount to be deducted to said payroll deduction card account for one or more successive pay periods; and deducting from said payroll automatically and dynamically the amount of said charge, wherein said participating merchant is not said employee's employer.

2. The method of claim 1 further comprising:

establishing a number of pay periods during which payroll deductions can occur;

establishing a credit limit for said employee; and deducting said amount to be deducted from said employee's paycheck for more than one successive pay period.

3. The method of claim 2, wherein the step of establishing guidelines further comprises the steps of:

authorizing the participating merchant to offer interest free payroll deductions up to a predefined time for payments over a certain amount; and;

authorizing the participating merchant to automatically deduct monthly payments from employees that are authorized to use payroll deduction for such transactions.

4. The method of claim 3, wherein the step of establishing guidelines further comprises the step-of establishing several sets of guidelines, whereby each set of guidelines is associated with employees within a particular status.

5. The method of claim 4, further comprising the step of storing the established guidelines and other identifying information for the employer, merchant and employee in a system database.

6. The method of claim 1, further comprising the steps of periodically providing, by the employer, a list with information about employees who qualify to participate to use said payroll deduction card account, and storing the list with information in a system database.

7. The method of claim 6, wherein submitting information on said payroll deduction card account, further comprises entering information stored on a magnetic strip on said a payroll deduction card into a network infrastructure.

8. The method of claim 7, further comprising storing information in the system database in a network processor database and periodically synchronizing information in the system database and information in the network processor database.

9. The method of claim 8 further comprising storing the employee account information on a magnetic strip on said payroll deduction card.

10. The method of claim 9 further comprising using the account information on the magnetic strip and information on the network processor database to verify the employee's employment status and account information and to verify that a submitting merchant is a participating merchant.

11. The method of claim 1 further comprising notifying the employee of transactions conducted on their payroll deduction card account.

12. The method of claim 1 further comprising issuing a payroll deduction card including a microchip for storing the employee account information and purchasing history and updating information on the chip to reflect each transaction.

13. The method of claim 12, wherein issuing said payroll deduction card further comprises creating private brand cards for execution on an existing network infrastructure.

* * * * *